United States Patent [19]

Bell et al.

[11] 3,754,217

[45] Aug. 21, 1973

[54] SYNCHRONOUS LINE CONTROL DISCRIMINATOR

[75] Inventors: Noel J. Bell, Durham; Ronald J. Cooper, Raleigh; Frederick P. Nagle; Frank A. Newlin, III, both of Cary; William M. Stadler, Raleigh, all of N.C.

[73] Assignee: International Business Machines Corporation, Armonk, N.Y.

[22] Filed: Dec. 20, 1971

[21] Appl. No.: 209,913

[52] U.S. Cl. .............................................. 340/172.5

[51] Int. Cl. .......................... G06f 3/00, H03k 13/00

[58] Field of Search ...................... 340/172.5, 152 R, 340/167 R; 178/17 R

[56] References Cited

UNITED STATES PATENTS

| | | | |
|---|---|---|---|
| 3,588,834 | 6/1971 | Pedersen et al. | 340/172.5 |
| 3,400,375 | 9/1968 | Bowling et al. | 340/347 R |
| 3,576,396 | 4/1971 | Sloate | 340/172.5 X |
| 3,457,368 | 7/1969 | Houcke | 178/17 R |
| 3,175,191 | 3/1965 | Cohn et al. | 340/167 R X |
| 3,631,455 | 12/1971 | Gregg | 340/152 R X |
| 3,611,294 | 10/1971 | O'Neill et al. | 340/154 X |
| 3,531,776 | 9/1970 | Sloate | 340/172.5 X |

*Primary Examiner*—Paul J. Henon
*Assistant Examiner*—Mark Edward Nusbaum
*Attorney*—Delbert C. Thomas et al.

[57] ABSTRACT

The described apparatus is interposed between the modem or line adapter of a synchronous transmission line and the data processor and will identify for the processor, the code in which data is being received. The discriminator is particularly useful in a system where any one of a number of data terminals using different transmission codes can be connected to one of the ports of the processor. In use, the discriminator examines, at each bit time, the last grouping of bits it has received to detect the presence of a code identifying character. When it detects one such character, the system waits until another character is received to determine if the second character is consistent with the tentatively identified code. If not, the system resets to continue looking for a new identification character. The system continues hunting until a transmission code is fully identified. The discriminator then notifies the processor of the code in which the data is being received.

4 Claims, 2 Drawing Figures

PATENTED AUG 21 1973 3,754,217

SYNCHRONOUS LINE CONTROL DISCRIMINATOR

OBJECTS OF THE INVENTION

In many of the data communication systems, it has been the practice to provide each group of terminals of the same characteristics with a corresponding group of input connections to the processor. The processor programs were so arranged that they would apply the correct code translation and line control procedures to the communications at such inputs. The number of input connections assigned to each group of terminals would be statistically determined to give the desired quality of service to the group of terminals. For several such groups, this will usually result in less than a full utilization of the input capacity of each group.

It is clear that the larger the group of terminals, the more closely will the actual traffic distribution approach the ideal distribution. The present invention permits the merging of several of the prior art terminal groups into one larger group. This will enable the total number of input connections to be reduced without any degradation in the services being rendered. The merging of groups is achieved by providing a set of input connections for all synchronously transmitting terminals of a predetermined speed without respect to the type of code which they transmit or their line control techniques.

It is then an object of this invention to provide a discriminator for an input connection for a processor to monitor an input signal and to determine the code in which data is being transmitted.

Another object is to provide a code discriminator to detect the distinguishing characteristics of an input signal and to inform a controlling processor of the code detected.

A further object is to provide an arrangement for a data input connection selectable by transmitting terminals of different characteristics and capable of analyzing the received data to identify the characteristics of a connected terminal.

Still another object is the provision of such a discriminator which will make a tentative identification of the characteristics of a terminal, will check the identification, and will reset itself if the tentative identification was not confirmed.

A still further object is to provide structure to detect if a special type of transmission is being received and upon detection of such special type of transmission, to convert the special type to a normal input type.

The foregoing and other objects, features and advantages of the invention will be apparent from the following description of a preferred embodiment of the invention, as illustrated in the accompanying drawings.

PRIOR ART

In data processing systems which can be time shared by different users, it has been customary to provide a group of input connections for each type of terminal units using the system. Each terminal type was restricted to using a few inputs because it was only at those terminals that the processor would apply the line codes sent out by the terminal. Such grouping of inputs and terminals required a generally excessive number of available inputs to insure a high degree of accessibility. In this type of system, there was no coding problem for the processor could associate each input with a particular code. Among the normally used coding systems are the Binary Synchronous Codes using either the Extended Binary Coded Decimal Interchange Code (EBCDIC) or the United States Americal Standard Information Interchange (USASCII), the Synchronous Data Line Control (SDLC) normally in a Non-Return to Zero Inverted (NRZI) format, and the Six Bit Transcode (SBT).

PREFERRED EMBODIMENT OF THE INVENTION

Figure 1:
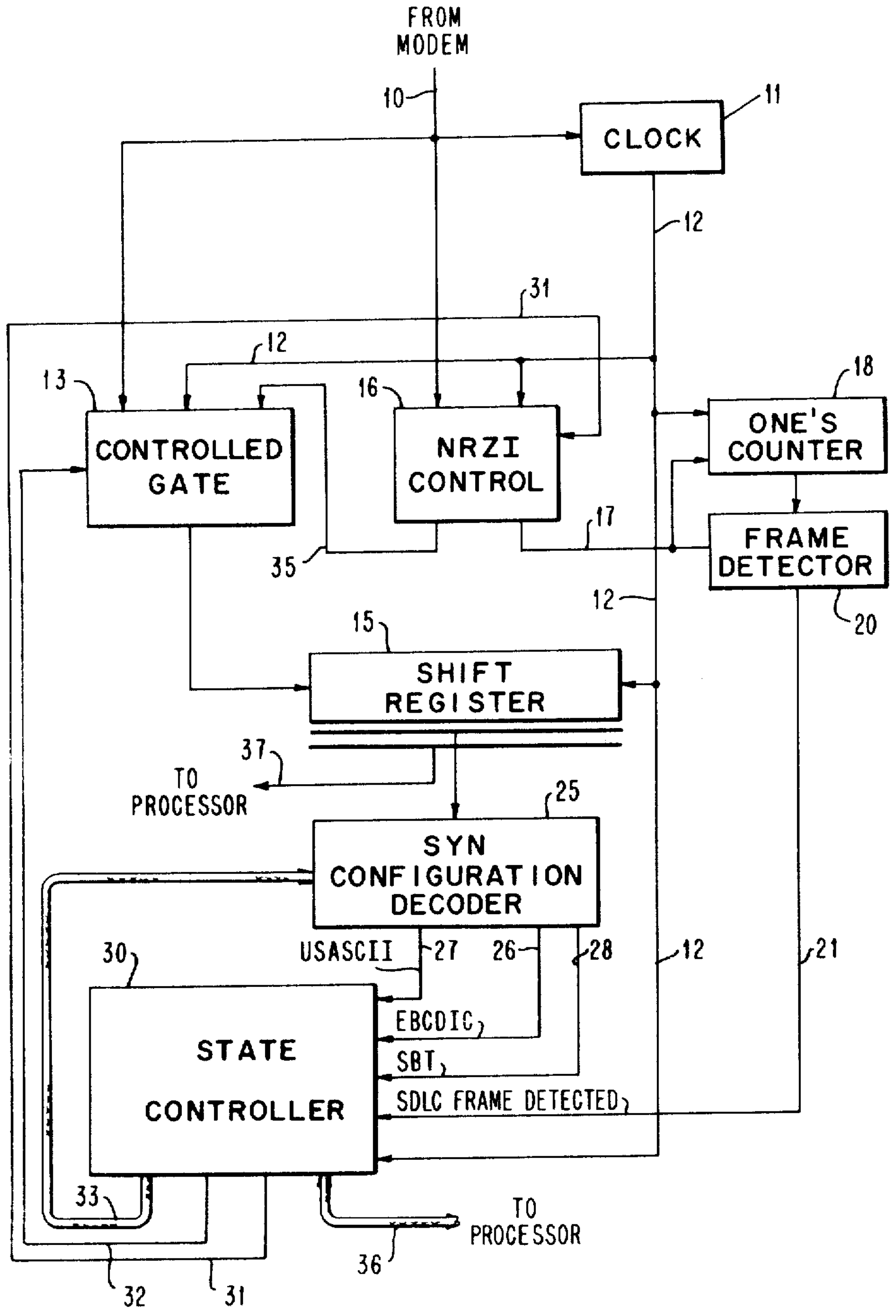
FIG. 1 is a diagram of the interconnections between the components of the discriminator.

In the configuration shown, all of the inputs can receive synchronous data in any of the acceptable codes so that any synchronous terminal of suitable speed can be switched in at any input. In FIG. 1, input line 10 receives the input data from a modem of the conventional type which converts the data on a communications line into a two D. C. level signal. A clock 11 synchronizes itself with the voltage transitions on line 10 to provide timing signals on an output 12 to the other components. The signals on output 12 can be a single sampling signal or several signals related thereto by slight time delays if a sequence of operations is required. The input signals on line 10 will be clocked through a controlled gate 13 of the type shown in FIG. 1 of U. S. Pat. No. 3,151,313, into a shift register 15 shifted by clock pulses on output 12 to deserialize the input data and present the last eight bits received in a static form. The data on line 10 is also gated by clock output 12 into an NRZI control unit 16 which converts the data signals according to the NRZI rules. Some of the NRZI formats used are to have a D.C. level transition at the beginning of each data pulse of one type, i.e., a "zero" or a "one" or to always have a level transition at some point in a bit period, e.g., the start or the middle, and to have a second transition at the other point if the data for that pulse if of one type. Control 16 may comprise a decoder for converting from NRZI type signals to conventional data signals as is described by Bailey and Lewis, FIGS. D and E, on pages 1015 and 1017 inclusive of the Dec. 1969 issue of the IBM Technical Disclosure Bulletin, Vol. 12, No. 7. Control 16 will convert the signal on line 10 to two level pulses on line 17. The pulses on line 17 may or may not actually represent actual data or signals being received but any "ones" representing signals will be clocked by output line 12 into a counter 18. This counter 18 is well-known in NRZI detectors and counts strings of ones. It will be reset to a zero count when any "zero" signal occurs on line 17. An exemplary resettable counter of this type is shown in FIG. 1 of U.S. Pat. No. 3,611,298.

Initial characters in an NRZI transmission are called "frame" characters and comprise a "zero" bit, six "one" bits and a terminating "zero" bit, written in hexadecimal code as "7E." When frame detector 20, of the type shown in FIG. 12 of U.S. Pat. No. 3,081,446, finds that counter 18 has reached a count of six and that the next bit on line 17 is a "zero" bit, it puts a signal on its output line 21 to indicate that is has detected an SDLC frame character.

Until data transmissions are found to be in the NRZI format, the bits stored in shift register 15 are continuously scanned by a sync configuration detector 25, which may comprise a decoder of the type shown in FIG. 12. of U.S. Pat. No. 3,081,446. The detector 25 looks for a hexadecimal character of "32" (00110010) in register 15 and when it is found, will put an output signal on a line 26 to indicate that an EBCDIC sync character has been found. Detector 25 also scans for a configuration of hexadecimal "16" (00010110) and when this is found, output line 27 receives a signal to indicate detection of the sync character for the USACII code. Decoder 25 will put a signal on line 28 when it finds the SBT sync configuration of 111010.

A state controller 30 receives the signals on lines 21, 26, 27 and 28 together with a clock signal on line 12 and controls the discriminator operations over its outputs 31, 32, and 33. Output line 31 will disable the NRZI control 16, output line 32 will set the controlled gate 13 to pass the data signals on NRZI output line 35 through to shift register 15, and output lines 33 can be pulsed to disable one or more of the sync decoders in configuration decoder 25. An output cable 36 from controller 30 to the associated data processor will inform the processor of the code translations to be used for the data signals after an input code has been detected and will also carry control signals from the processor to controller 30.

Figure 2:
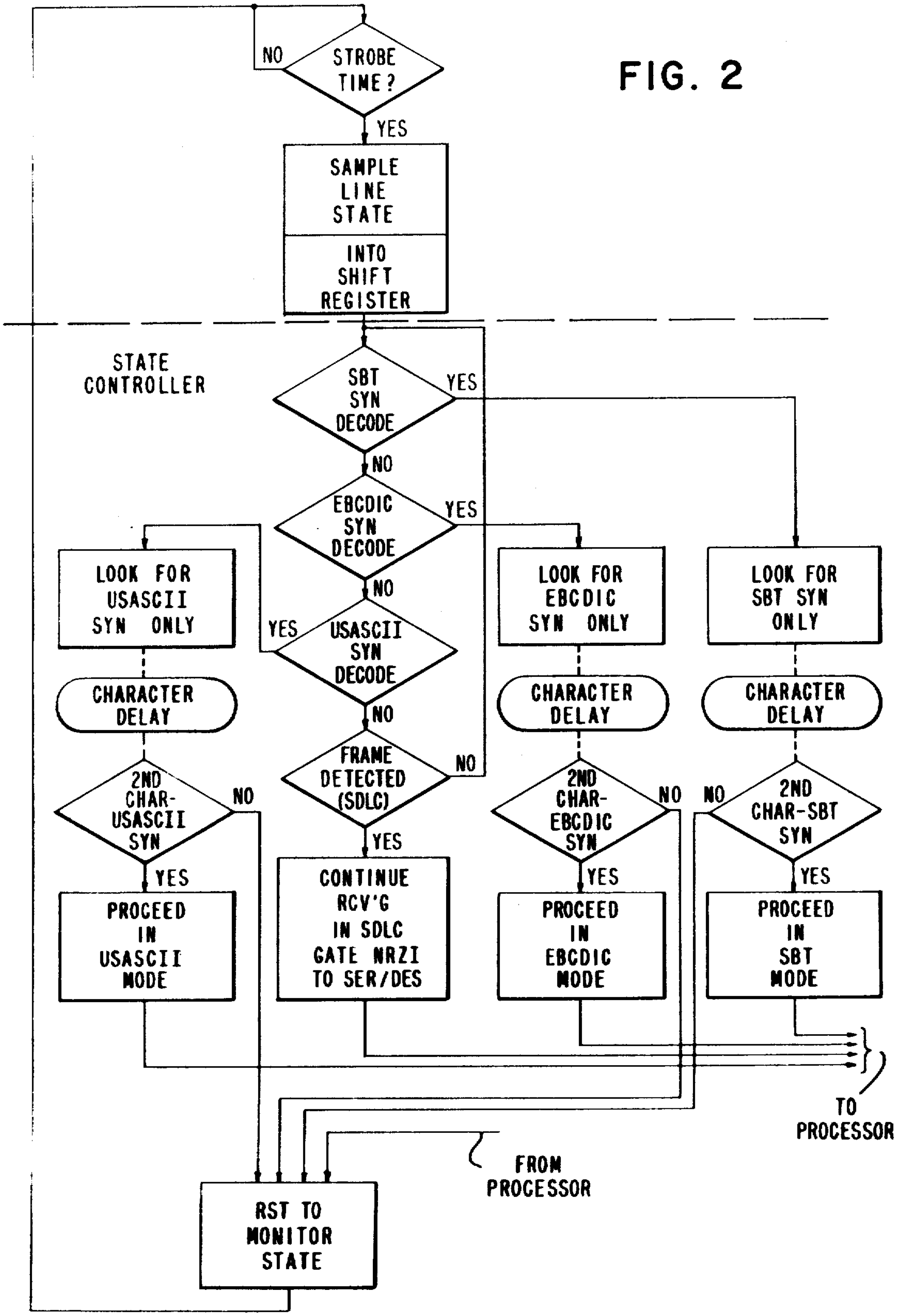
FIG. 2 is a flow chart of the sequence of operations within the discriminator.

The sequence of operations within controller 30 are set out in the flow chart of FIG. 2. The controller 30 will normally look for a clock signal on line 12 indicating that it is time to sample the data line 10 into shift register 15. At this time, controller 30 checks lines 21, 26, 27, and 28 to see if a code defining character has been detected. If line 21 is active indicating that an NRZI frame character has been found, the controller 30 notifies the processor and changes gate 13 to transfer the NRZI decoded data on line 35 into shift register 15 from which the processor can gate out the data on a character bus 37.

Detection of an identifying character for the EBCDIC, USASCII or SBT codes is not a complete identification, however, and detection of a second similar character is required. For each of these codes, the detection of a sync character will set controller 30 to block detector 20 and decoder 25 from putting output signals on any of the lines 21, 26, 27 and 28 except the line for the tentatively identified code. In each case, the controller will count off a full character period and will test the only line left active of lines 26, 27, and 28. If the tested line indicates that a second sync character of the same type has been found, the controller 30 notifies the processor over lines 36 of the transmission code in which data is being received. A failure at this second testing time to receive a duplicate sync character indicates an error has occurred and resets the controller 30 to the initial state to continue looking for a valid sync character. At the end of all data communications, the terminal will disconnect and the processor will reset the discriminator to enable it to identify the code of the next terminal connecting to the input 10. Thus, the discriminator will operate to continuously inspect the data input line until it receives a valid code identification, will for most codes, check the identification, and will notify the processor when a code has been fully identified.

While the invention has been particularly shown and described with reference to the above preferred embodiment, it will be understood that various changes in details may be made therein without departing from the spirit and scope of the invention as set out in the following claims.

What is claimed is:

1. A data communications system of the type having a data processor, a plurality of data transmitting terminals transmitting data characters bit by bit in differing codes and selectively connectable to a receiving unit common to said terminals, and a code discriminator between said receiving unit and an input of said data processor to identify the code being received from a connected one of said terminals, said discriminator comprising:

a shift register to store at least enough of the last received data bits to form one data character;

a decoder connected to said shift register to normally scan the bits stored therein to detect a bit combination identifying one of said transmission codes;

a controller activated when said decoder identifies any of said transmission codes;

blocking means activated by said controller to block said decoder from thereafter identifying a different transmission code; and a plurality of circuits activated by said controller to identify to said processor the code in which a terminal is transmitting data, said circuits being activated by said controller when a code is fully identified.

2. A discriminator as set out in claim 1, including:

a converter connected to said receiving unit and effective to change a data transmission signal of the NRZI type to a compatible signal having a pulse for each data bit of one significance;

a code identification character detector responsive to the compatible signal output of said converter;

connections from said detector to said controller to activate said controller when said detector has found a code identification character;

a gate on the input of said shift register to pass to said shift register either the data bits as received or the output of said converter; and a connection from said controller to switch said gate to pass said converter output to said shift register when said controller is activated from said detector.

3. In a data communications system having a data processor, a plurality of terminals transmitting data bit by bit in a number of different code formats and in differing types of signals, each terminal prefixing a data transmission with a plurality of repetitions of a code identifying character, and a receiving unit at which all data transmission are received, the combination of:

a storage to temporarily retain the data bits of one type of signal as they are received by said receiving unit, said storage having sufficient capacity to retain at least enough of the last received data bits to form one character length of the longest identifying character;

a decoder having an identifying character section for each code format in one type of said signals, each section continuously scanning said storage to detect the presence of its identifying character in the last received data bits;

a controller to coordinate operations of said decoder;

connections from each section of said decocder to said controller to activate said controller for one character length interval when an identifying character is scanned;

controller outputs energized by said controller when activated to deactivate said sections which have not decoded an identifying character; and circuits in said controller includes means for signalling said processor if a similar identifying character is thereafter decoded, said circuits also including means for reactivating said sections if said similar character is not received.

4. A data communications system as set out in claim 3, including:

a converter to change data signals received from said receiving unit in an NRZI type code to data signals of said one type;

a detector responsive to the data signal output of said converter to generate an output when the identifying character for said NRZI type of transmission is detected;

a gate to switch the input of said storage to the output of said converter; and a circuit activated by the output of said detector to energize said controller to operate said transfer gate, to deactivate all of said decoder sections and to signal the identity of said identified code to said processor.

* * * * *